(No Model.) 4 Sheets—Sheet 1.
R. ARTMANN & R. PROEHL.
CORN HARVESTER AND BINDER.
No. 545,441. Patented Sept. 3, 1895.
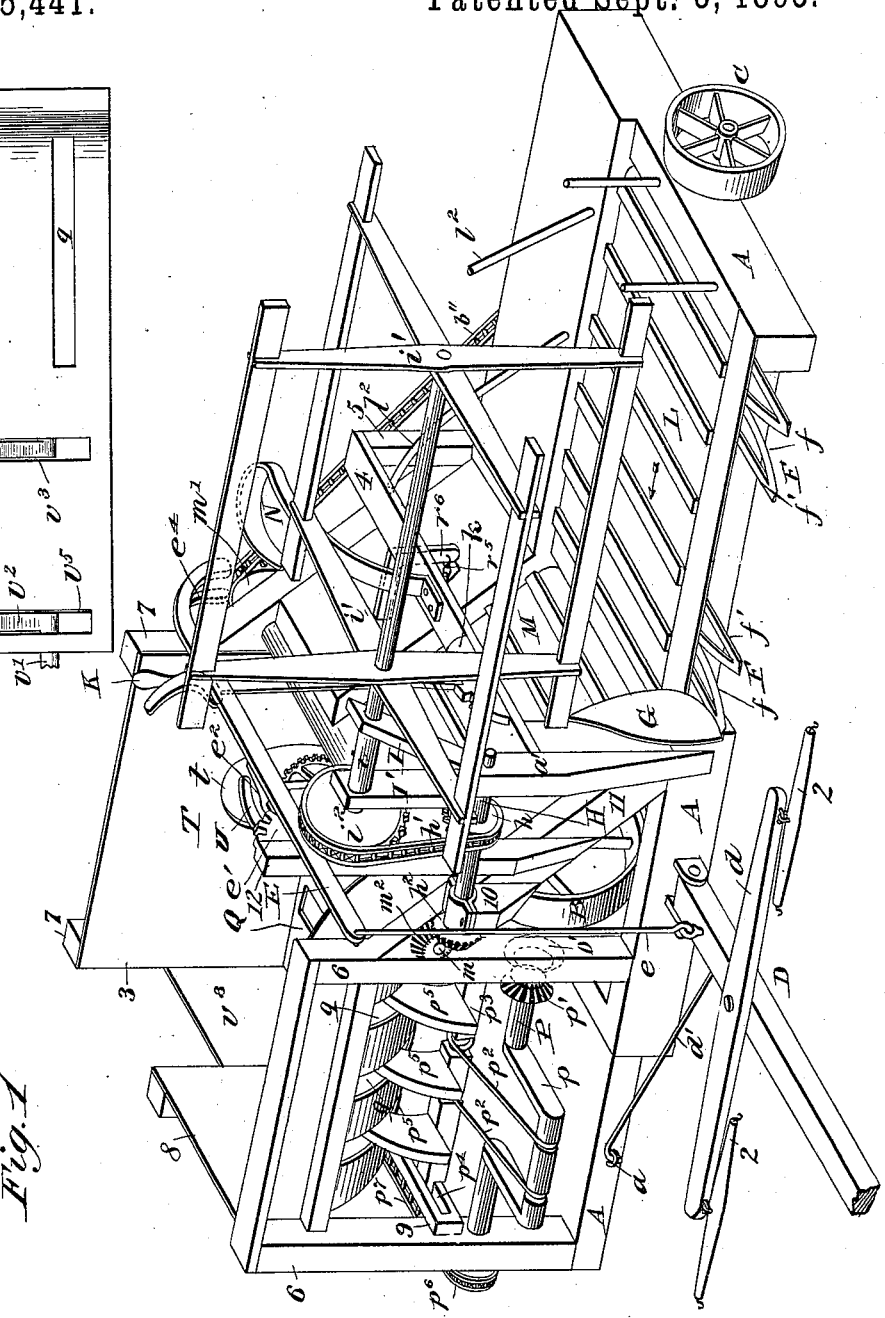
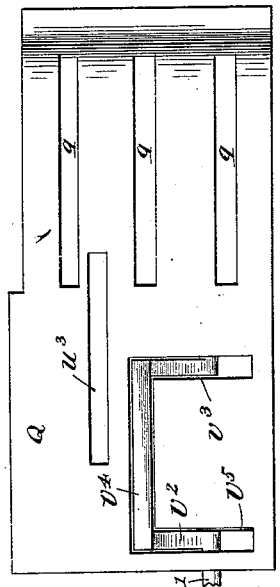
Fig. 6
Fig. 1
Witnesses:
Inventors
Richard Artmann and
Rinhart Proehl
by
Louis Feeser
their Attorney.

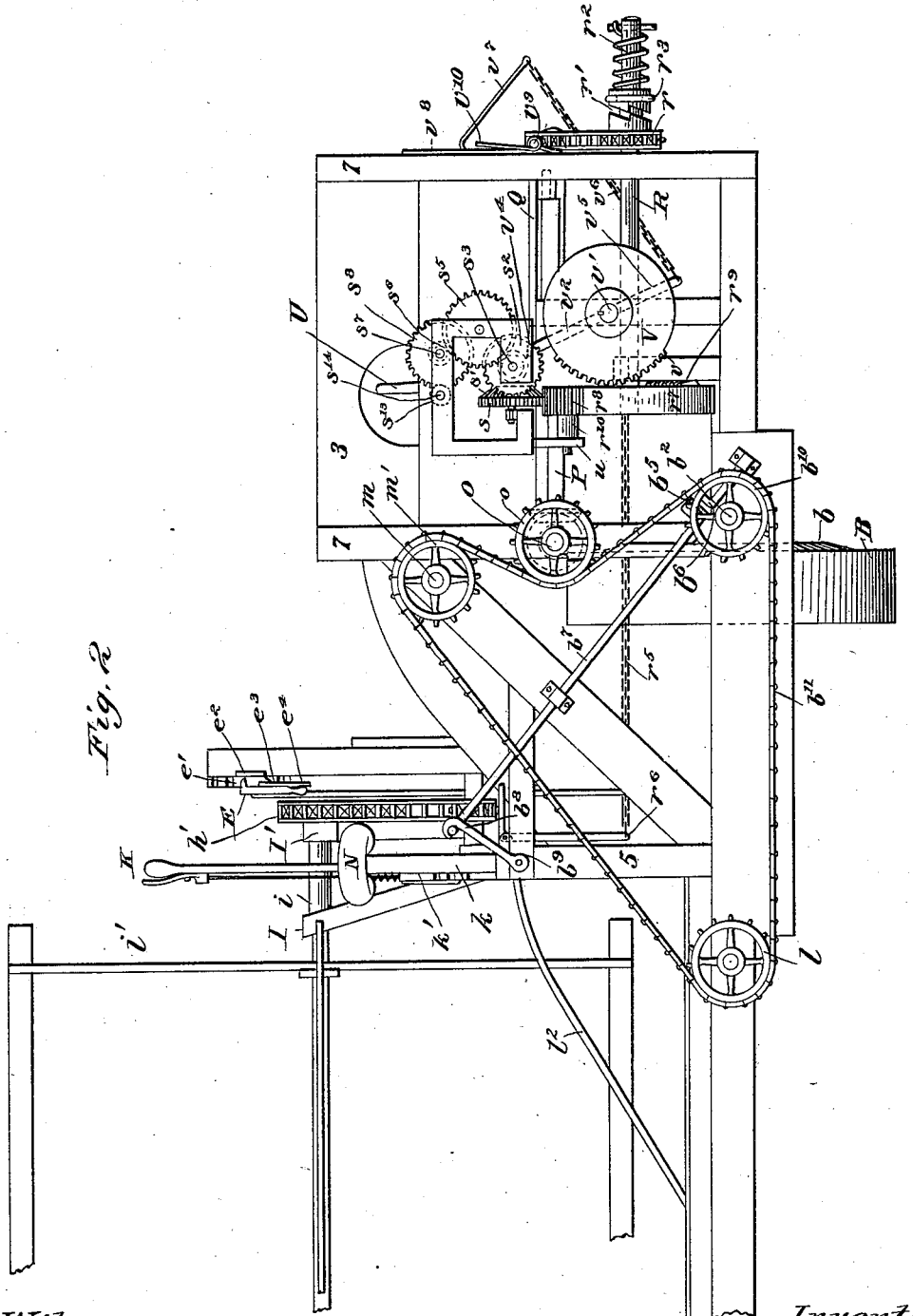

(No Model.) 4 Sheets—Sheet 3.
R. ARTMANN & R. PROEHL.
CORN HARVESTER AND BINDER.
No. 545,441. Patented Sept. 3, 1895.
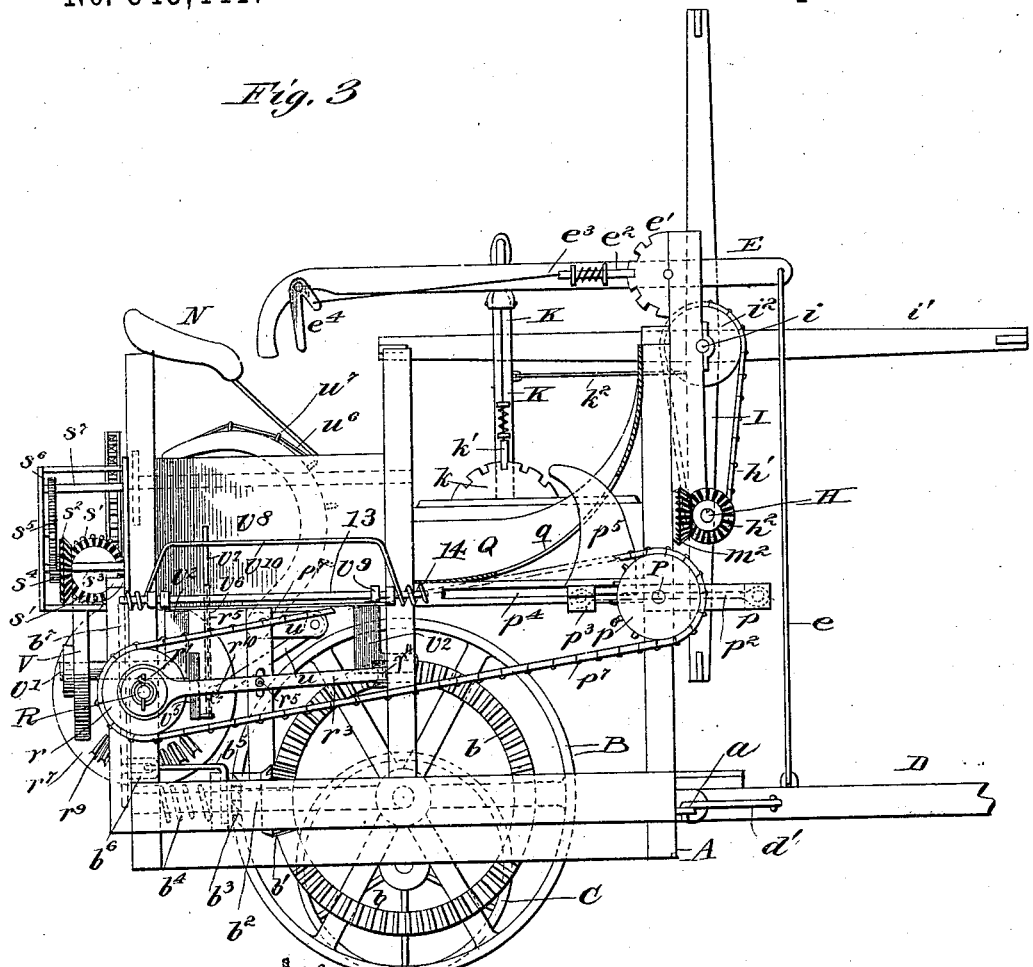
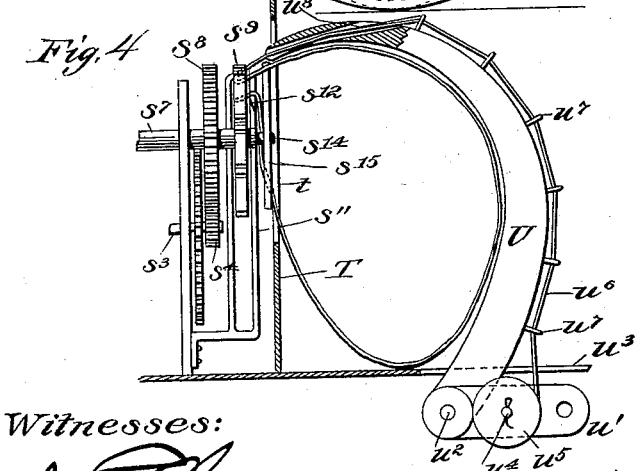
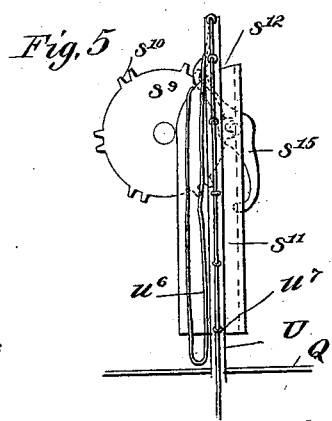
Witnesses:
Inventors
Richard Artmann and
Rinhart Proehl
by
Louis Feeser
their Attorney (No Model.) 4 Sheets—Sheet 4.
R. ARTMANN & R. PROEHL.
CORN HARVESTER AND BINDER.
No. 545,441. Patented Sept. 3, 1895.
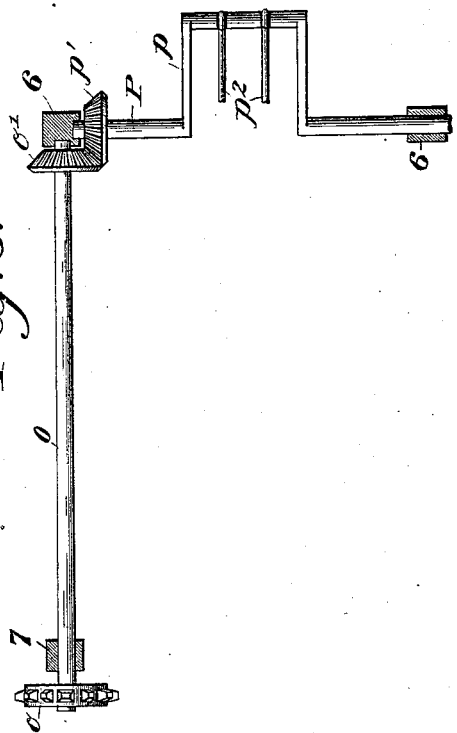
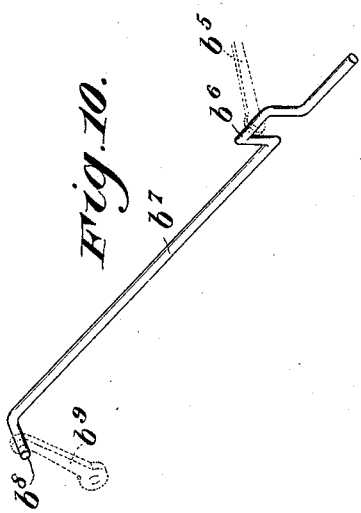
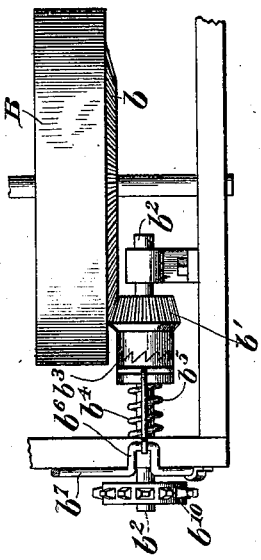
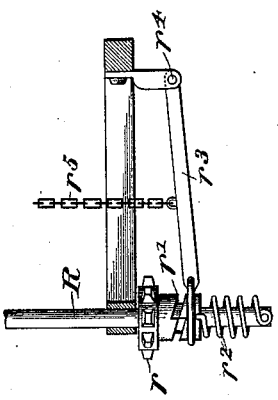
Witnesses:
J. M. Witherow
V. B. Hillyard
Inventors
Richard Artmann
& Rinhart Proehl,
By their Attorneys.
C. A. Snow & Co.

UNITED STATES PATENT OFFICE.

RICHARD ARTMANN AND RINHART PROEHL, OF MAPLETON, MINNESOTA.

CORN HARVESTER AND BINDER.

SPECIFICATION forming part of Letters Patent No. 545,441, dated September 3, 1895.

Application filed April 28, 1894. Serial No. 509,520. (No model.)

*To all whom it may concern:*

Be it known that we, RICHARD ARTMANN and RINHART PROEHL, citizens of the United States, residing at Mapleton, in the county of Blue Earth and State of Minnesota, have invented certain new and useful Improvements in Corn Harvesters and Binders; and we do hereby declare that the following is a full, clear, and exact description of the invention, such as will enable those skilled in the art to which it appertains to make and use the same.

Our invention relates to corn harvesters and binders, and aims to provide a machine of improved construction whereby the several operations of cutting the corn, forming the same into gavels, binding the latter, and throwing the completed gavels from the machine can be performed by mechanical appliances in a rapid and satisfactory manner and without any attention other than that required of the driver to throw the binding mechanism into gear after a sufficient quantity of corn has been gathered to form a gavel or bundle of required size.

Other objects will appear from the following description, taken in connection with the accompanying drawings, in which—

Figure 1 is a perspective view of a machine constructed in accordance with and embodying the vital features of the invention. Fig. 2 is a rear elevation of the machine, the outer portion of the platform and reel being broken away. Fig. 3 is a side elevation as seen from the side provided with the binding and bundle or gavel forming mechanism. Fig. 4 is a side elevation of the needle or binding-arm and the wire-twisting mechanism, showing the end of the needle or binding-arm directly above the slotted tube and placing the wire between the teeth of the wire-holding wheel. Fig. 5 is a detal view of the needle or binding-arm, the slotted tube, the wire-holding wheel, and the wire-twister. Fig. 6 is a top plan view of the gavel-forming compartment bottom. Fig. 7 is a detail view of the mechanism for throwing the machine in and out of gear. Fig. 8 is a detail view of the provisions for transmitting motion to the packer-operating shaft. Fig. 9 is a detail view of the clutch mechanism for throwing the binding mechanism in and out of gear. Fig. 10 is a detail view of the rod for throwing the machine in and out of gear.

The platform A is of substantially a rectangular shape, and is supported about midway of its ends upon a ground-wheel B, by means of which the operating parts of the machine are driven, and a small wheel C at one end. The pole or tongue D has pivotal connection with the front portion of the platform, and is braced against lateral stress by means of a stay-rod $d'$, having pivotal connection at its front end with the tongue and having its rear end bent and engaging a staple or eye $a$ near the outer end of the platform. The doubletree $d$ is connected with the pole in the usual manner, and is provided at its ends with singletrees 2, to which the team for drawing the machine over the field is hitched. One end of the platform is provided with a horizontally-disposed endless apron L and with the cutting apparatus F and the other end with the gavel-forming compartment 3 and the packing and binding mechanism. A post $a'$ rises vertically from the front portion of the platform A at about a middle point, and is connected by means of a horizontal bar 4 with a similarly-disposed rear post 5. The driver's seat N is mounted upon the bar 4, and a notched segment $k$ is secured to the said bar 4 and is engaged by a hand-latch $k'$, provided on a lever K, which is connected by means of a rod $k^2$ with a swinging frame composed of bars I and I', having pivotal connection at their lower ends with the post $a'$. On operating the lever K the said frame I I' is moved upon its pivotal support to bring the reel $i'$ supported thereby more or less directly over the carrier or apron L to throw the corn to the required position upon the said apron. The reel $i'$ is of ordinary construction, and its shaft $i$ is journaled in the said swinging frame and is provided with a sprocket-wheel $i^2$, by means of which power is transmitted to the reel-shaft for operating the reel.

Uprights or standards 6 rise vertically from the front portion of the platform and corresponding uprights 7 project vertically from the rear portion. Between these uprights is formed the compartment 3, which constitutes the gavel or bundle forming compartment.

A vertical wall T connects the uprights 7 and forms the rear closure, the outer side being closed by a gate $v^3$ and a wall 8, the bottom Q curving upward and closing the front side of the said compartment. The front curved portion of the bottom Q is provided with a series of slots $q$, through which operate a series of packers $p^5$, mounted upon a bar $p^3$, which has its ends reduced and working in slots $p^4$ in side bars 9. The packer-shaft P is journaled at its ends in the standards 6 and has a crank portion $p$, connected by a pitman $p^2$ with the bar $p^3$, so as to reciprocate the latter in the slots of the bars 9. A sprocket-wheel $p^6$ is fixed upon the outer end of the packer-shaft and is connected by a sprocket-chain $p^7$ with a sprocket-wheel $r$ on the shaft R to transmit movement to the latter shaft when it is required to throw the binding mechanism into active operation. A bevel-pinion $p'$ on the inner end of the packer-shaft P is in mesh with a corresponding bevel-pinion $o'$ on the front end of a shaft O, which is journaled in the inner standards 6 and 7 and which has a sprocket-wheel $o$ on its rear end to be engaged by the drive-chain $b^{11}$.

An upwardly-inclined apron M extends from the inner end of the apron L to the upper portion of the gavel-compartment 3, and its purpose is to supply the corn to the latter compartment in the formation of the gavels or bundles. This apron M is driven by means of a sprocket-wheel $m'$ on the rear end of a shaft $m$, extending parallel with the shaft O, and around which sprocket-wheel passes the drive-chain $b^{11}$. The front end of the shaft $m$ has a bevel-pinion $m^2$, which meshes with a bevel-pinion $h^2$ on the end of a short shaft H, which is journaled in the posts $a'$, and a block 10, fastened to a brace 11. A sprocket-pinion $h$, fastened upon the shaft H, is connected by means of a sprocket-chain $h'$ with the sprocket-wheel $i^2$, thereby transmitting motion to the reel in the operation of the machine.

A short shaft $b^2$, extending parallel with the shafts O and $m$, has a sprocket-wheel $b^{10}$ on its rear end, around which passes the drive-chain $b^{11}$, and upon the inner end portion of which is mounted a bevel-pinion $b'$ to mesh with a bevel-gearing $b$ on the side of the drive or ground wheel B. A clutch $b^3$ is adapted to move upon the shaft $b^2$ and throw the machine in and out of gear by gearing or ungearing the bevel-pinion $b'$ with the shaft $b^2$, as will be readily understood. A spring $b^4$ is provided to normally hold the clutch in gear. A rod $b^7$ has a crank portion $b^6$, which is connected by means of a shipper-arm $b^5$ with the clutch, and which has its upper end extending within convenient reach of the driver's seat and bent outward, as shown at $b^8$, to be engaged by a hooked catch $b^9$ when it is required to hold the clutch out of gear. When the clutch is in gear, the drive-chain $b^{11}$ will be actuated and drive the several sprocket-wheels $m'$, $o$, $b^{10}$, and $l$, the latter being on the end of a shaft by means of which the endless apron L is operated.

The cutting apparatus is provided in sets and disposed to correspond to the relative position of the rows of stalks, so as to cut two rows at the same time, each set comprising two oppositely-disposed knives of similar construction and formed of a curved blade $f$ and a straight brace portion $f'$, the straight brace portions extending in parallel relation and the curved blades being beveled to a knife-edge and flaring outwardly from the rear to the front ends. A shield or guard G is disposed at the inner front corner of the apron L and prevents the lodgment of stalks against the post $a'$. Curved bars or rods $l^2$ are attached at their lower ends to the rear portion of the platform A and curve upwardly and forwardly, and are designed to engage with the upper ends of the stalks and retard their movement, whereby the butt-ends are caused to advance so that the stalks will be deposited in the gaveling-compartment with the butt-ends opposite the gate $v^3$. There may be as many of these rods $l^2$ as desired to attain the required result. Usually two will be sufficient.

In order to raise and lower the front end of the platform, a lever E is provided and connected at one end by a rod $e$ with the tongue or pole D, and is equipped with a spring-actuated latch $e^2$ to engage with a notched segment $e'$, secured to a standard 12, said latch being connected with the hand-lever $e^4$ through the wire or rod $e^3$. On operating the hand-lever $e^4$ the lever E is released and can be adjusted to secure the required elevation of the front end of the platform, as will be readily appreciated.

The binding and wire-twisting mechanisms are disposed at that end of the machine having the gaveling-compartment, the wire-twisting provisions being located to the rear of the wall T and being reached by the needle or binding-arm U through an opening $t$ in the lower portion of the said wall T. The needle or binding-arm U is curved, and is provided with a longitudinal passage $u^8$ in its free end portion for the passage of the binding-wire $u^6$, the latter passing through a series of guide-eyes $u^7$ on the rear edge of the binding-arm and wound upon a reel or spool $u^5$, journaled upon a support $u^4$ on a projecting portion $u'$ of the binding-arm U. This binding-arm is pivotally supported at $u^2$, and is adapted to operate through a slot $u^3$ in the bottom Q of the gaveling compartment. A pitman $u$ connects the projecting portion $u'$ with a wrist-pin $r^{10}$ on a mutilated gear-wheel $r^7$, mounted upon the shaft R. This gear-wheel $r^7$ has cog-teeth $r^8$ on its peripheral edge to engage with a pinion $s$ and cog-teeth $r^9$ on its side at a diametrically-opposite point to engage with cog-teeth $v$ on a mutilated gear-wheel V, mounted upon a short shaft $v'$, to the inner or front end of which is attached an approximately U-shaped ejector-frame $v^2$, which is adapted to operate through a substantially U-shaped slot $v^3$ in the bottom of the gaveling-compartment. The upper face of the ejector-frame is beveled and comes about flush with the top side of the bottom Q, as shown at $v^4$. One side of the ejector-frame is extended to provide an arm $v^5$, which is connected by means of a chain $v^6$ with an arm $v^7$, attached to the gate $v^8$, whereby the latter is opened simultaneously with the movement of the ejector-frame to throw the gavel or bound bundle from the compartment. This gate is hinged at its lower end upon a rod 13 in any desired manner, the ends of the said rod being extended to receive the coils 14 of a wire bent to form a nearly U-shaped spring $v^{10}$, which bears against the gate $v^8$ and normally holds the latter closed. The hinge-joint $v^9$ between the gate and the frame of the machine may be provided in any of the usual ways, so long as it will admit of the gate swinging downward and outward from the upper end.

On the end of the shaft R is fixed a mutilated gear-wheel $r^7$, having two cogged portions $r^8$ $r^9$, the former being on part of the periphery and the latter on part of the side. The cogged portion $r^8$ engages a gear-wheel $s$, having a bevel-gear $s'$ integral with it, the said bevel-gear meshing with a bevel gear-wheel $s^2$, mounted on a spindle $s^3$ and driving a gear-pinion $s^4$, which in turn drives a gear-wheel $s^5$, meshing with a pinion $s^6$ on a spindle $s^7$, upon which is fixed a gear-wheel $s^8$ and a wire-holding wheel $s^9$, provided at equal intervals on its periphery with double teeth $s^{10}$, as shown most clearly in Fig. 5. This wheel $s^9$ rotates partly in a tube $s^{11}$, open on the side opposite the wheel $s^9$ and provided on one side with a curved cutting-edge $s^{12}$ at its upper end. The gear-wheel $s^8$ drives a pinion $s^{13}$, mounted upon a twister-shaft $s^{14}$, which carries a wire-twister $s^{15}$ at its front end, the extremities of the wire-twister being curved or hooked in the direction of the rotation of the wire-twister to engage with the strands of the wire-loops and twist the latter in the operation of binding the gavels.

When the machine is in active service, the operation of its component parts may be briefly stated as follows: The machine is drawn over the field in the manner set forth, so that the knives will straddle the rows and sever the stalks, which latter will fall upon the apron L, the tops reaching beyond and striking the inclined or curved rods $l^2$, which tend to throw the said top portions of the stalks in a direction opposite to the travel of the aprons L and M, while the latter carry the butts of the stalks in the direction of the arrow and deliver them into the gaveling-compartment upon the floor Q butt-end foremost, when the packers will engage the stalks and force them toward the rear wall T, thus forming the gavels or bundles.

In setting the binder mechanism the end of the wire $u^6$ is secured in the tube $s^{11}$ by inserting it between a pair of the teeth $s^{10}$ on the wheel $s^9$ and then rotating the latter until the wire is caught in the tube. As the binding-arm U is swung below the floor or bottom of the gaveling-compartment, the wire will extend from the tube to the end of the arm and will rest upon the said floor. The packers, therefore, will force the corn on top of the wire, and when the binding-arm U is thrown up and toward the twister it will compress the gavel and draw the wire around the bundle, the wire being unreeled from the spool $u^5$ and hanging in a loop at the end of the binding-arm when the latter is immediately over the tube $s^{11}$. This loop is caught by the double teeth $s^{10}$ on the wheel $s^9$, and the wire is drawn down into the tube by the rotation of said wheel $s^9$. At the same time the twister is revolved, one of its hooked ends catching the upper portion of the wire, while the other hooked end will catch the lower portion of the wire, whereby the wires are twisted together. By this time the wheel $s^9$ will have rotated so far that the loop of wire will be drawn well into the tube $s^{11}$ and the strain on the wire over the sharp edge $s^{12}$ of the said tube will be sufficient to cut the wire. The end of the wire from the spool is, however, retained by the teeth $s^{10}$ of the wheel $s^9$, as there is no strain on this wire, the wire unwinding from the spool as the binding-arm swings back to its normal position, while at the same time the ejector-frame is swung upward and forward, rising through the opening in the floor or bottom Q and forcing the completed gavel from the machine, the door $v^8$ being opened simultaneously with the operation of the ejector-frame by means of the chain $v^6$, the said door closing on the return of the frame to a normal position by means of the spring $v^{10}$. It will be observed that the clutch $b^3$ may be coupled or uncoupled by the driver by means of the rod $b^7$, and when coupled the reel, the two aprons, and the packers are put in operation by the forward movement of the machine through the field. The binding and twisting mechanism, however, is only put in motion when desired by the driver, who presses his foot upon the treadle-lever $r^6$, which is connected by means of a chain $r^5$ to a shipper-lever $r^3$, pivoted at $r^4$ and having engagement with the clutch $r'$ on the shaft R, whereby the latter is driven from the packer-shaft P. The clutch $r'$ is normally held out of engagement with the sprocket-pinion $r$ by means of a spring $r^2$ on the outer end of the shaft R.

In adapting the invention to the various styles of machines to attain the desired result it is manifest that changes in the form, proportion, and the minnor details of construction may be resorted to without departing from the principle or sacrificing any of the advantages of this invention.

Having thus fully described our invention, what we claim as new, and desire to secure by Letters Patent, is—

1. In a corn harvester, the combination of a platform having at one end a cutting apparatus, a reel, and a horizontally-disposed traveling apron, and at the opposite end a gavel-forming compartment having a floor curved upwardly at its front end and provided with a series of slots, a bar having packers to operate through the said slots, actuating mechanism for the said packers, a binding arm adapted to operate through a slot in the said bottom, a wire-twisting mechanism arranged exterior to the gavel-forming compartment, an ejector arranged to operate through an opening in the floor of the compartment and moved by the packer actuating mechanism, a gate closing an opening in the side of the aforesaid compartment, a spring for normally holding the gate closed, and connections between the said gate and the ejector, whereby the two operate simultaneously, substantially as described for the purpose set forth.

2. In a corn harvester, the combination with the platform and a gavel-forming and binding mechanism at one end of the platform, of a cutting apparatus at the opposite end of the platform, a traveling apron disposed in the rear of the cutting apparatus, and bars arranged to engage with the top ends of the stalks and tilt the latter, whereby the butt ends are caused to advance toward the gavel-forming and binding provisions, substantially as set forth.

3. In a corn harvester, the combination with the platform having a gavel-forming and binding mechanism at one end, of a cutting apparatus at the opposite end of the platform, a traveling apron located in the rear of the cutting apparatus, a reel disposed to operate directly above the traveling apron, and bars arranged to co-operate with the reel and apron to reverse the position of the stalks and cause the latter to advance butt end foremost toward the gavel-forming and binding mechanism, substantially as specified.

4. In a corn harvester, the combination with a platform having a cutting apparatus and traveling aprons, of a gavel-forming compartment having a bottom, or floor, curved upwardly at its front end and provided with a series of slots, a packer arranged to operate through the slots, a binding arm to move upward through the bottom of the compartment, a wire-twisting mechanism in the rear and exterior to the said compartment, a gate, or door, closing an opening in the side of the compartment, and an ejector adapted to operate through an opening in the floor of the compartment and operatively connected with the gate, whereby the said parts operate in unison, substantially as and for the purpose set forth.

5. In a corn harvester, the combination with a platform provided with cutting apparatus and traveling aprons, of a gavel-forming compartment having its bottom curved upwardly on its front side and provided with slots, a bar provided with a series of packers to operate through the said slots, a binding mechanism, a door, or gate, closing an opening in the side of the compartment, an approximately U-shaped ejector frame having its upper portion normally closing a slot in the bottom of the compartment, and actuating means for the said ejector frame and gate, whereby these parts are operated at the same time to throw the bundle from the machine, substantially as set forth.

6. The herein-specified corn harvester and binder, comprising a platform having a gavel-forming compartment at one end and the cutting apparatus at the opposite end, traveling aprons to convey the stalks to the compartment, a reel adjustably mounted over the horizontal apron, rods arranged in the rear of the apron and adapted to engage with the tops of the stalks and cause the latter to advance butt end foremost to the compartment, a wire-twisting mechanism arranged in the rear of the compartment, and comprising a slotted tube having a cutting edge, a wire holder, and a twister, the latter having hooked ends, a binding arm adapted to operate through a slot in the bottom of the compartment and through an opening in the rear wall of the said compartment to reach the wire-twisting mechanism, packers disposed to operate through slots in the front curved end of the compartment bottom, a door closing an opening in the side of the compartment, an ejector frame operatively connected with the door, and constructed to normally close a slot in the bottom of the compartment, actuating mechanism for the ejector frame, binding arm and twisting mechanism operatively connected with the packer driving mechanism, and a clutch under the control of the driver to throw the binding mechanism in gear when required, substantially as set forth.

In testimony whereof we have hereunto set our hands in presence of two subscribing witnesses.

RICHARD ARTMANN.
RINHART PROEHL.

Witnesses:
LOUIS FEESER, Jr.,
HENRY ROCHAT.